US012770280B2

(12) United States Patent
Nielsen et al.

(10) Patent No.: US 12,770,280 B2
(45) **Date of Patent: *Oct. 20, 2026**

(54) COMPUTING A POINT CLOUD FROM STITCHED IMAGES

(71) Applicant: Snap Inc., Santa Monica, CA (US)

(72) Inventors: Simon Saito Haagen Nielsen, Beverly Hills, CA (US); John Christopher Collins, Mico, TX (US); Allan Joseph Evans, Los Angeles, CA (US); Graham Shaw, Redondo Beach, CA (US); Vikas Gupta, San Francisco, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,011

(22) Filed: Jun. 27, 2024

(65) Prior Publication Data

US 2024/0346672 A1 Oct. 17, 2024

Related U.S. Application Data

(63) Continuation of application No. 17/743,268, filed on May 12, 2022, now Pat. No. 12,073,577, which is a (Continued)

(51) Int. Cl.
*G06T 7/55* (2017.01)
*B64C 39/02* (2023.01)

(Continued)

(52) U.S. Cl.
CPC .............. *G06T 7/55* (2017.01); *B64C 39/024* (2013.01); *G06T 3/4038* (2013.01);

(Continued)

(58) Field of Classification Search
None
See application file for complete search history.

(56) References Cited

U.S. PATENT DOCUMENTS 6,038,295 A 3/2000 Mattes
6,639,596 B1 * 10/2003 Shum .................... G06T 3/4038 345/427

(Continued)

FOREIGN PATENT DOCUMENTS

CA 2887596 A1 7/2015
EP 3595287 A1 1/2020
WO WO-2012005140 A1 1/2012

OTHER PUBLICATIONS

US 10,656,660 B1, 05/2020, Meisenholder et al. (withdrawn)

(Continued)

*Primary Examiner* — Randolph I Chu
(74) *Attorney, Agent, or Firm* — Schwegman Lundberg & Woessner, P.A.

(57) ABSTRACT

A method and system for creating a point cloud are disclosed. A first image is captured by a first camera sensor and a second image is captured by a second camera sensor. The first and the second image have an area of overlap. Location of the first camera relative to the second camera is predetermined and each of the first and the second camera is having a field of view of more than 180 degrees. Based on the area of overlap, the first and the second image are stitched to create a composite stitched image. In one aspect, depth information from the area of overlap is extracted based on the predetermined location and a point cloud is created from otherwise to be discarded image data in the area of overlap.

20 Claims, 9 Drawing Sheets

Related U.S. Application Data continuation of application No. 16/131,961, filed on Sep. 14, 2018, now Pat. No. 11,348,265.

(60) Provisional application No. 62/559,213, filed on Sep. 15, 2017.

(51) Int. Cl.
*G06T 3/4038* (2024.01)
*H04N 23/698* (2023.01)
*B64U 101/30* (2023.01)

(52) U.S. Cl.
CPC ....... *H04N 23/698* (2023.01); *B64U 2101/30* (2023.01); *B64U 2201/104* (2023.01); *G06T 2207/10028* (2013.01)

(56) References Cited

U.S. PATENT DOCUMENTS

| | | | |
|---|---|---|---|
| 6,819,982 | B2 | 11/2004 | Doane |
| 6,980,909 | B2 | 12/2005 | Root et al. |
| 7,173,651 | B1 | 2/2007 | Knowles |
| 7,176,960 | B1 | 2/2007 | Nayar et al. |
| 7,260,258 | B2 | 8/2007 | Foote et al. |
| 7,411,493 | B2 | 8/2008 | Smith |
| 7,535,890 | B2 | 5/2009 | Rojas |
| 7,542,073 | B2 | 6/2009 | Li et al. |
| 8,131,597 | B2 | 3/2012 | Hudetz |
| 8,174,562 | B2 | 5/2012 | Hartman |
| 8,199,747 | B2 | 6/2012 | Rojas et al. |
| 8,274,550 | B2 | 9/2012 | Steuart, III |
| 8,332,475 | B2 | 12/2012 | Rosen et al. |
| 8,646,720 | B2 | 2/2014 | Shaw |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,164,506 | B1 * | 10/2015 | Zang .................... G05D 1/0011 |
| 9,191,776 | B2 | 11/2015 | Root et al. |
| 9,204,252 | B2 | 12/2015 | Root |
| 9,253,486 | B2 | 2/2016 | Tian et al. |
| 9,344,642 | B2 | 5/2016 | Niemi et al. |
| 9,345,711 | B2 | 5/2016 | Friedhoff |
| 9,443,227 | B2 | 9/2016 | Evans et al. |
| 9,471,059 | B1 | 10/2016 | Wilkins |
| 9,489,661 | B2 | 11/2016 | Evans et al. |
| 9,489,937 | B1 | 11/2016 | Beard et al. |
| 9,491,134 | B2 | 11/2016 | Rosen et al. |
| 9,576,369 | B2 | 2/2017 | Venkataraman et al. |
| 9,589,448 | B1 | 3/2017 | Schneider et al. |
| 9,681,046 | B2 | 6/2017 | Adsumilli et al. |
| 9,723,272 | B2 | 8/2017 | Lu et al. |
| 9,747,901 | B1 | 8/2017 | Gentry |
| 9,922,659 | B2 | 3/2018 | Bradlow et al. |
| 9,989,965 | B2 | 6/2018 | Cuban et al. |
| 10,061,328 | B2 | 8/2018 | Canoy et al. |
| 10,109,224 | B1 | 10/2018 | Ratti et al. |
| 10,140,987 | B2 | 11/2018 | Erickson et al. |
| 10,168,700 | B2 | 1/2019 | Gordon et al. |
| 10,205,927 | B2 | 2/2019 | Hattori et al. |
| 10,268,892 | B1 | 4/2019 | Miller et al. |
| 10,306,267 | B2 | 5/2019 | Lin et al. |
| 10,370,118 | B1 | 8/2019 | Nielsen et al. |
| 10,501,180 | B2 | 12/2019 | Yu |
| 10,565,787 | B1 | 2/2020 | Jordan |
| 10,768,639 | B1 | 9/2020 | Meisenholder et al. |
| 11,126,206 | B2 | 9/2021 | Meisenholder et al. |
| 11,348,265 | B1 | 5/2022 | Nielsen et al. |
| 12,073,577 | B2 * | 8/2024 | Nielsen ................... G06T 7/593 |
| 2007/0081091 | A1 * | 4/2007 | Pan ........................ G03B 37/04 348/E5.053 |
| 2007/0250526 | A1 | 10/2007 | Hanna |
| 2008/0255842 | A1 | 10/2008 | Simhi |
| 2009/0122133 | A1 | 5/2009 | Hartman |
| 2011/0202598 | A1 | 8/2011 | Evans et al. |
| 2011/0267508 | A1 | 11/2011 | Kane et al. |
| 2012/0194420 | A1 | 8/2012 | Osterhout et al. |
| 2012/0209924 | A1 | 8/2012 | Evans et al. |
| 2012/0281885 | A1 | 11/2012 | Syrdal et al. |
| 2012/0287274 | A1 | 11/2012 | Bevirt |
| 2013/0056581 | A1 | 3/2013 | Sparks |
| 2013/0156336 | A1 * | 6/2013 | Suk ........................... G06T 3/14 382/284 |
| 2013/0238168 | A1 | 9/2013 | Reyes |
| 2014/0254896 | A1 | 9/2014 | Zhou et al. |
| 2015/0022432 | A1 | 1/2015 | Stewart et al. |
| 2015/0070272 | A1 | 3/2015 | Kim et al. |
| 2015/0175263 | A1 | 6/2015 | Reyes |
| 2015/0199022 | A1 | 7/2015 | Gottesman et al. |
| 2015/0287246 | A1 | 10/2015 | Huston et al. |
| 2015/0331490 | A1 | 11/2015 | Yamada |
| 2015/0350542 | A1 * | 12/2015 | Steuart, III ............ G03B 35/08 348/36 |
| 2015/0362917 | A1 | 12/2015 | Wang et al. |
| 2016/0063987 | A1 | 3/2016 | Xu et al. |
| 2016/0161946 | A1 | 6/2016 | Wuth Sepulveda et al. |
| 2016/0179096 | A1 | 6/2016 | Bradlow et al. |
| 2016/0198088 | A1 | 7/2016 | Wang et al. |
| 2016/0261829 | A1 | 9/2016 | Olsson et al. |
| 2016/0292886 | A1 | 10/2016 | Erad et al. |
| 2016/0307573 | A1 | 10/2016 | Wobrock |
| 2016/0336020 | A1 | 11/2016 | Bradlow et al. |
| 2017/0031369 | A1 | 2/2017 | Liu et al. |
| 2017/0094259 | A1 | 3/2017 | Kouperman et al. |
| 2017/0099424 | A1 | 4/2017 | Jones |
| 2017/0102699 | A1 | 4/2017 | Anderson |
| 2017/0177925 | A1 | 6/2017 | Volkart |
| 2017/0225796 | A1 | 8/2017 | Sun et al. |
| 2017/0228690 | A1 | 8/2017 | Kohli |
| 2017/0237908 | A1 | 8/2017 | Ko et al. |
| 2017/0244937 | A1 | 8/2017 | Meier et al. |
| 2017/0320564 | A1 | 11/2017 | Kuzikov |
| 2017/0337791 | A1 | 11/2017 | Gordon-carroll |
| 2017/0366803 | A1 | 12/2017 | Kerstein |
| 2017/0371353 | A1 | 12/2017 | Millinger, III |
| 2018/0002035 | A1 * | 1/2018 | Neely .................. H04N 13/204 |
| 2018/0012335 | A1 | 1/2018 | Adsumilli et al. |
| 2018/0025467 | A1 | 1/2018 | Macmillan et al. |
| 2018/0048801 | A1 | 2/2018 | Kiser et al. |
| 2018/0075635 | A1 | 3/2018 | Choi et al. |
| 2018/0082682 | A1 | 3/2018 | Erickson et al. |
| 2018/0103196 | A1 | 4/2018 | Lee et al. |
| 2018/0118337 | A1 | 5/2018 | Viel |
| 2018/0246529 | A1 | 8/2018 | Hu et al. |
| 2018/0278916 | A1 | 9/2018 | Kim et al. |
| 2018/0286067 | A1 | 10/2018 | Lee |
| 2019/0003398 | A1 | 1/2019 | Gibson et al. |
| 2019/0011921 | A1 | 1/2019 | Wang et al. |
| 2019/0082103 | A1 | 3/2019 | Banerjee et al. |
| 2019/0098276 | A1 | 3/2019 | Duggan et al. |
| 2020/0159222 | A1 | 5/2020 | Mao et al. |
| 2020/0169659 | A1 | 5/2020 | Abbas |
| 2020/0241575 | A1 | 7/2020 | Meisenholder et al. |
| 2021/0127092 | A1 * | 4/2021 | Rezvani ............... H04N 23/951 |
| 2021/0195163 | A1 | 6/2021 | Oh et al. |
| 2021/0200246 | A1 | 7/2021 | Deruaz-Pepin |
| 2021/0362848 | A1 | 11/2021 | Spencer |
| 2021/0382503 | A1 | 12/2021 | Meisenholder et al. |
| 2022/0270277 | A1 | 8/2022 | Nielsen et al. |

OTHER PUBLICATIONS

Shum et al. ("Stereo Reconstruction from Multiperspective Panoramas", IEEE Transactions on Pattern Analysis and Machine Intelligence, vol. 26, No. 1, Jan. 2004) (Year: 2004).*

"U.S. Appl. No. 16/131,961, Examiner Interview Summary mailed Aug. 12, 2020", 3 pgs.

(56) References Cited

OTHER PUBLICATIONS

"U.S. Appl. No. 16/131,961, Non Final Office Action mailed Apr. 2, 2020", 11 pgs.
"U.S. Appl. No. 16/131,961, Notice of Allowance mailed Jan. 28, 2022", 9 pgs.
"U.S. Appl. No. 16/131,961, Notice of Allowance mailed Apr. 16, 2021", 9 pgs.
"U.S. Appl. No. 16/131,961, Notice of Allowance mailed Sep. 25, 2020", 9 pgs.
"U.S. Appl. No. 16/131,961, Response filed Aug. 7, 2020 to Non Final Office Action mailed Apr. 2, 2020", 10 pgs.
"U.S. Appl. No. 17/743,268, Final Office Action mailed Jan. 11, 2024", 6 pgs.
"U.S. Appl. No. 17/743,268, Non Final Office Action mailed Jan. 6, 2023", 12 pgs.
"U.S. Appl. No. 17/743,268, Non Final Office Action mailed Jul. 13, 2023", 18 pgs.
"U.S. Appl. No. 17/743,268, Notice of Allowance mailed Apr. 16, 2024", 9 pgs.
"U.S. Appl. No. 17/743,268, Response filed Mar. 11, 2024 to Final Office Action mailed Jan. 11, 2024", 11 pgs.
"U.S. Appl. No. 17/743,268, Response filed Mar. 20, 2023 to Non Final Office Action mailed Jan. 6, 2023", 9 pgs.
"U.S. Appl. No. 17/743,268, Response filed Oct. 13, 2023 to Non Final Office Action mailed Jul. 13, 2023", 10 pgs.
Garg, et al., "Relative Depth Estimation using a Rotating Camera System", Geology, (2013).
Kang, et al., "Automatic Registration of Terrestrial Laser Scanning Point Clouds using Panoramic Reflectance Images", Sensors, (2009).
Laput, Gierad, et al., "PixelTone: A Multimodal Interface for Image Editing", ACM, Proceedings of the SIGCHI Conference on Human Factors in Computing Systems, Paris, FR, (2013), 10 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Meisenholder, David, et al., "Remoteless Control of Drone Behavior", U.S. Appl. No. 15/640,143, filed Jun. 30, 2017, 108 pgs.
Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.
Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.
"U.S. Appl. No. 17/743,268, 312 Amendment filed Jul. 15, 2024", 7 pgs.
"U.S. Appl. No. 17/743,268, PTO Response to Rule 312 Communication mailed Jul. 22, 2024", 2 pgs.

* cited by examiner

COMPUTING A POINT CLOUD FROM STITCHED IMAGES

PRIORITY CLAIM

This application is a continuation of U.S. patent application Ser. No. 17/743,268, filed May 12, 2022, which is a continuation of U.S. patent application Ser. No. 16/131,961, filed Sep. 14, 2018, which claims the benefit of priority to U.S. Provisional Application Ser. No. 62/559,213, filed Sep. 15, 2017, each of which are hereby incorporated by reference in their entireties.

TECHNICAL FIELD

Embodiments of the present disclosure relate generally to navigation and positioning in space. More particularly, but not by way of limitation, the present disclosure addresses systems and methods for creating a point cloud based on overlapping images to be stitched. The point cloud data being used for positioning in space in one embodiment.

BACKGROUND

Creation of 360-degree image that represent complete view of a surrounding environment along with 3D information usually requires a number of camera sensors and complicated optics such as LIDAR (i.e., Light Imaging, Detection, And Ranging) and stereoscopic camera arrays. An example is a camera that has 24 camera sensors to capture full RGB (i.e., red, green, and blue) and depth data at every pixel in each of the 24 camera sensors. By oversampling with image data at every pixel, such a camera is capable of creating high quality 3D information. However, combining numerous camera sensors to create high quality 3D information and 360 degree images adds weight, cost and complexity.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
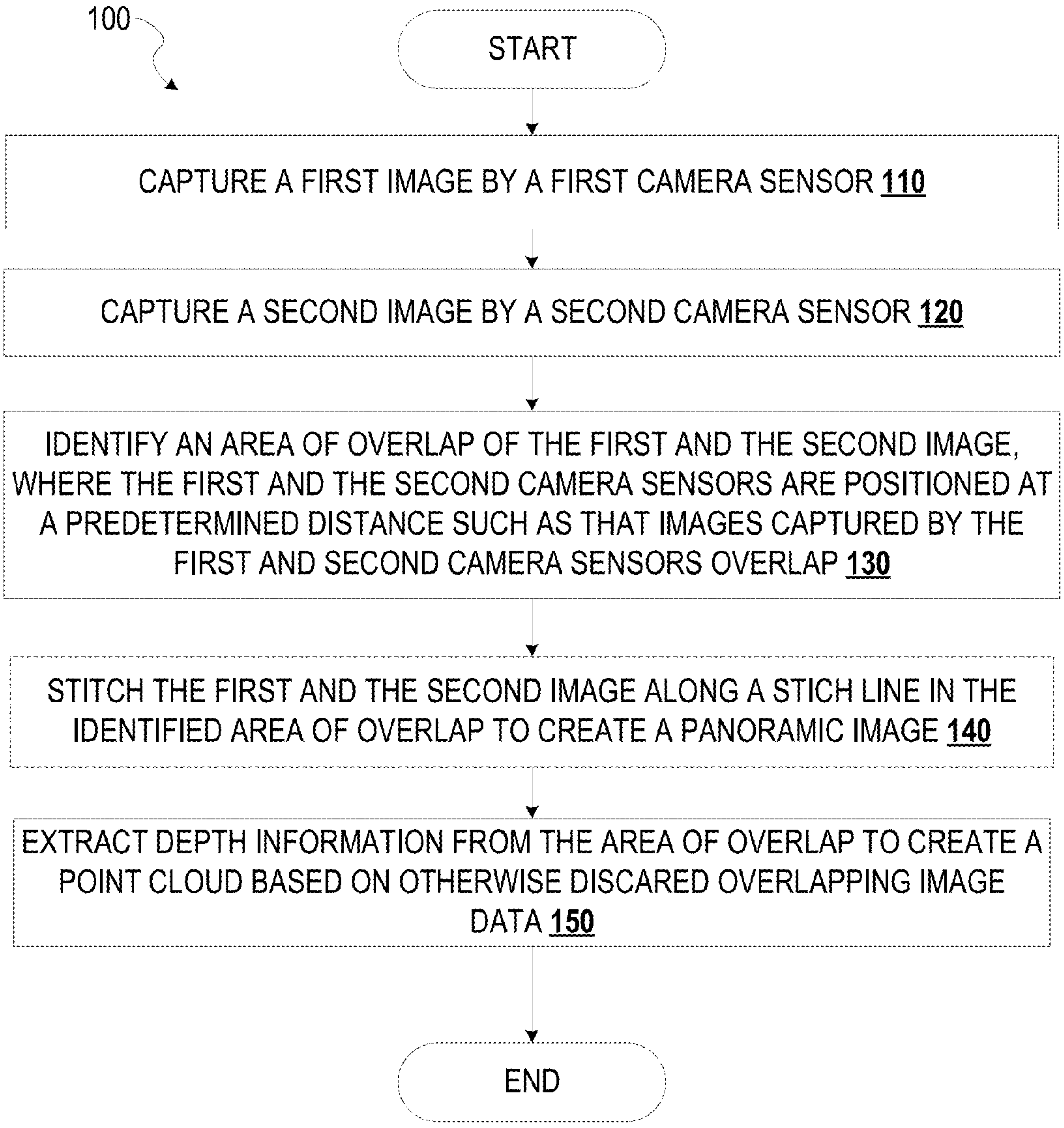
FIG. 1 illustrates a method for creating a point cloud from otherwise to be discarded overlapping image data used for stitching overlapping images, according to one embodiment.

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various embodiments described herein, a 360-degree image is generated using at least two images from at least two cameras. Such embodiments operate where the at least two images have an overlapping region with image data that represents captured overlapping regions from the surrounding environment. Overlapping image data is used to create the 360-degree image, stitching is performed along a stitching line of the overlapping region. However, in the process of stitching most of the overlapping image data is usually discarded. For example, overlapping data along the stitching line is used for stitching the at least two images but the remaining image data may be discarded. Stitching is a common technique used for obtaining 2D information, such as a panoramic, wider image, created from two or more images having a field of view of more than 180 degrees. For example, a 360-degree image may be created from two cameras having a field of view of more than 180 degrees.

In one embodiment, a system and method for obtaining depth information from at least two overlapping images that are being stitched along a stitching line in an area of overlap of the at least two images are disclosed. Parallax can be used to improve the stitching results and obtain improved stitched panoramic image but once the at least two images are stitched the overlapping image data not used in the stitching process is discarded in prior methods. In one embodiment, a point cloud is created from overlapping image data that instead to be discarded is used to determine depth information. This allows for efficiency and simplicity of the system and methods for creating a point cloud and integrating the process of creating a point cloud with the process of stitching overlapping images. Using otherwise to be discarded overlapping image data, distance from the cameras and objects in the environment may be determined.

Creation of a 360-degree image and 360-degree depth map may use multiple complicated camera sensor arrays. These camera sensor arrays are capable of obtaining high quality depth information by oversampling with image data. For example, having multiple images covering substantially the same surrounding. However, such high-quality 3D information and oversampling may not be a requirement for various applications. Further, to create a full 360 degrees depth map at least four or more cameras are usually used. Camera set ups that include 4 or more camera sensors, are expensive, complex, and heavy. Complexity, cost, and weight are evidently disadvantages, especially in systems where accurate and high-quality 3D information is not a requirement but a computational burden. In one embodiment, a simplified solution for creating 360-degree image and a point cloud data is implemented. In one embodiment, a 360-degree image and full 360-degree depth map are created in an integrated process by utilizing the built-in spinning ability of drones described in further detail in relation to FIG. 3A.

FIG. 1 illustrates method 100 for creating a point cloud from otherwise to be discarded overlapping image data used for stitching overlapping images, according to one embodiment. At 110, a first image is captured by a first camera sensor. At 120, a second image is captured by a second camera sensor. The two cameras do not necessarily have to be set to the same exposure. However, if the two cameras that are set to be of the same exposure, a high dynamic range (HDR) image can be created. Using two or more cameras provides a super resolution for post processing. For example, elements captured in a first image may be blurred (e.g., a hand that slightly moved during capturing can result in a blurred element in), whereas the same elements captured in a second image might be less blurred or of otherwise better quality. In a post-processing operating, i.e., after capture of the first and second image, the better-quality elements may be selected to create a single best image based on the first and second image.

In one embodiment, the first and the second camera sensors are positioned at a predetermined distance such that images captured by the first and the second camera sensors overlap. Alternatively, already captured images may be obtained or received at a processing unit such as point cloud generator, described in further relation to FIG. 2. Regardless of whether the images pre-captured or not, location of the capturing cameras relative to each other is known or otherwise predetermined, according to one embodiment. The first and the second camera sensors may be part of the same camera or of separate cameras, respectively.

In one embodiment, at 130, the area of overlap of the first and the second image is identified or located. Various techniques may be used to identify the overlap region including, but not limited to, Scale Invariant Features (SIFT) point detection method, Harris feature point detection method, Susan feature point detection method, stereo matching method, or other feature point detection methods. Further, computer vision may be used determine ideal stationary points. For example, a mountain or building are stationary and more weight in the image processing process may be given to using such image elements as key points versus a car, a tree branch, or a person, for example. In some cases, the feature points may be selected manually to obtain the overlap region. Further, the degree of overlap is adjustable by changing positions of the cameras. Obtaining more overlap can result in more accurate feature points.

Once the overlap region is identified, at 140, the first and the second image are stitched along a stitching line in the identified area of overlap to create a panoramic image. In one embodiment, the created panoramic image may be a 360-degree image created by stitching the first and the second image.

Image stitching or photo stitching is the process of combining multiple photographic images with overlapping fields of view to produce a segmented panorama or high-resolution image. Image stitching is commonly performed through the use of computer software. Some digital cameras can do the stitching internally, either as a standard feature or by installing a smartphone application. When stitching images to create one panoramic image issues to be solve include the presence of parallax, lens distortion, scene motion, exposure differences, etc. For panoramic stitching, a reasonable amount of overlap may be, for example, at least 15-30% to overcome or compensate for lens distortion and aliasing, and other errors that can degrade a high-quality image. Overlap in the range of 15-30% comprises enough detectable features to allow the creation of 2D panoramic image from multiple overlapping images. However, once images are aligned, distinctive features are identified for establishing correspondences between pairs of images, and the images blended into a final 2D panoramic composition, the overlapping image data is discarded. In one embodiment, data to be discarded from the area of overlap of the pair of images is instead used for determining depth information. For example, the depth information is extracted, and a point cloud is created, according to one embodiment. The goal is to obtain a wider area of overlap of a sequence of images so that more depth information may be obtained, for example, a fuller depth map of the surrounding environment. Multi-dimensional data is extracted from overlapping data in the stitched regions.

Based on predetermined or otherwise known positions of the cameras relative to each other, 3D information may be extracted via triangulation thereby calculating the parallax between two or more overlapping images. In one embodiment, at 150, depth information from the area of overlap is extracted to create a point cloud based on otherwise discarded overlapping image data. Thus, data used for stitching is reused for the extraction of depth information. For example, the distance from the first and/or the second camera sensors and one or more object points in the surrounding environment may be determined based on the created point cloud. In one embodiment, the created point cloud may be used for determining a position in space. For example, the position of a drone with two mounted cameras relative to a user or a human operator may be determined based on the point cloud. In one embodiment, a distance from a drone carrying cameras and a user or another object of reference is determined based on the point cloud. Thus, point cloud calculation based on the principle of stereoscopic vision may be used in a number of exemplary methods including, but not limited to, autonomous self-positioning of a drone in space relative to various objects in space including an operator; calculating flight paths based on the distance from the drone and an object of reference; keep a pre-determined distance from an object or follow an object such as the user; avoiding obstacles by a drone; tracking and measuring the distance to a subject, and others. Reusing overlapping image data otherwise discarded in the stitching process leads to a technical effect of optimizing and simplifying drone navigation, according to on embodiment. For example, drones used for photography may be transformed to be capable of position and navigate in space by extracting depth information from otherwise discarded overlapping image data.

In one embodiment, the point cloud is created based on a predetermined distance of the two cameras mounted on the drone. When the cameras are mounted on a drone, the created point cloud enables navigation and positioning of the drone in space. For navigation and positioning in space, high quality and accurate depth information is not required. Approximation of the position of the drone in space with respect to specific objects or the surrounding environment is sufficient. Moreover, the captured overlapping image data may serve dual purposes, i.e., creating a panoramic image such as a 360-degree image and positioning the drone in space. Such techniques create a system for obtaining a point cloud that is technically simplified, requires less camera sensors with lower cost and weight.

Figure 2:
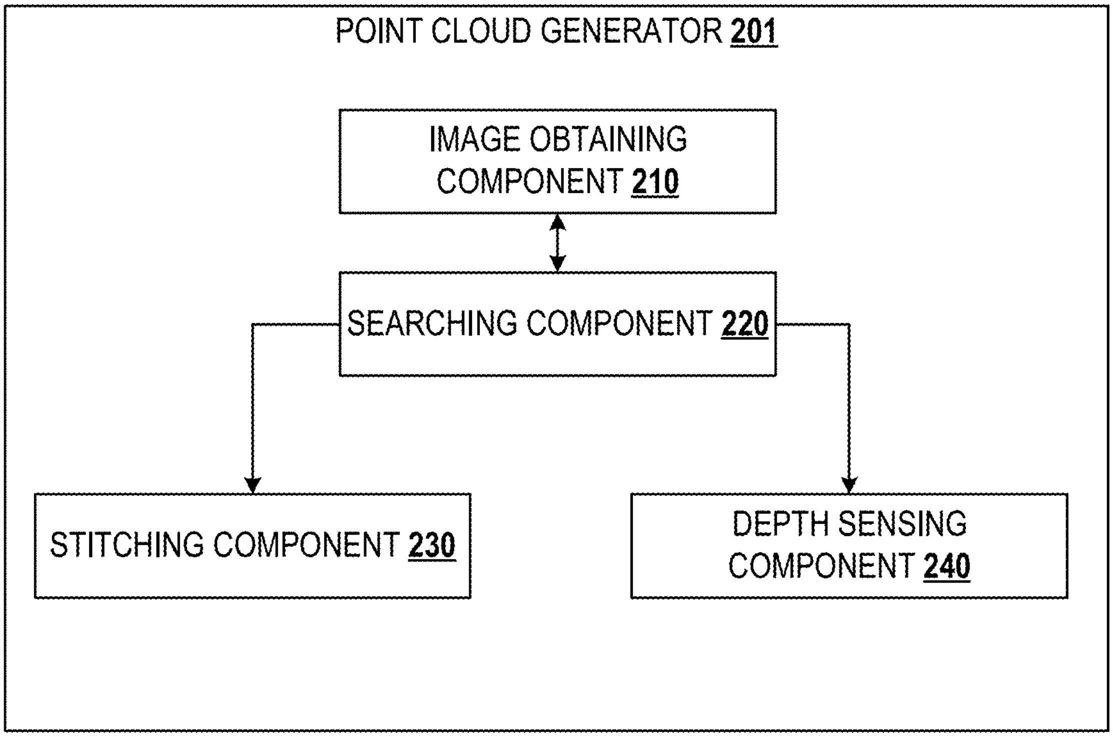
FIG. 2 illustrates a point cloud generator component, according to one embodiment.

FIG. 2 illustrates a point cloud generator 201, according to one embodiment. The point cloud generator 201 is an image processing component for the generation of point cloud data from at least two images. In one embodiment, the point cloud generator is implemented in the form of computer readable instructions. The point cloud generator 201 is a component that may be represented as machine readable instructions that when loaded into a navigation system such as a drone navigation system and be executed by one or more processors on the drone may cause the drone to adjust position in space based on computed or created point cloud. In one embodiment, the point cloud generator 201 may be a component part of an application on a digital device such as a client system 510 in FIG. 5. For example, the point cloud generator 201 may be part of a navigation system implemented on a client navigation system such as an application on a smart phone, a table, or another controller with capability to control and navigate a drone.

As shown in FIG. 2, a point cloud generator 201 component includes an image obtaining component 210, a searching component 220, an image stitching component 230 and a depth sensing component 240. In one embodiment, the image obtaining component 210 is configured to obtain two images or more. In one embodiment, the image obtaining component 210 includes a pair of cameras and the two images are obtained by photographing on cameras in real time. In another embodiment, image obtaining component 210 is an input interface and the two images are retrieved from an existing image library.

The searching component 220 is configured to search for the overlap region of the two or more images. In one embodiment, the searching component 220 may be used in step 130 described above in relation to FIG. 1. The image stitching component 230 is configured to stitch the two or more images into one image such as a panoramic image. The panoramic image may be with complete 360 degrees field of view or partial field of view, depending on the cameras filed of views of the lenses and position of the camera sensors relative to each other.

The depth sensing component 240 is configured to obtain the depth information from image data of the overlap region found by the searching component 220. In one embodiment, the depth sensing component 240 may obtain depth information in parallel, before or after the image stitching component 230 has stitched the images obtained by the image obtaining component 210. Once the searching component 200 has identified the areas of overlap between the obtained two or more images, the overlap regions are used for both stitching and obtaining depth information. In one embodiment, the depth information may be obtained by performing a calculation of the parallax between the two images. The parallax means a distance existing between the two camera sensors, and the distance, i.e., the depth, from an object point to the cameras. Therefore, the imaging position of the same object point is different in the two cameras, which is known as parallax. By triangulation, the distance from an object point to the cameras is determined, according to one embodiment. Therefore, the depth information may be calculated according to the parallax after the parallax is calculated. In one embodiment, the parallax between the corresponding pixels in the overlap region of the two images directly is calculated and the depth of the overlap region according to the parallax is calculated.

In a simplified embodiment of the system, two cameras sensors with a field of view of over 180 degrees are sufficient to create a panoramic image and compute a point cloud from at least two overlapping images sharing a field of view of more than 180 degrees. Various configurations and combinations of camera sensor arrays may be used including, but not limited to, camera sensors such as a global shutter camera, a rolling shutter camera, a monochromatic camera for obtaining 3D information, etc. It is preferred to use the camera(s) that are already built into or mounted on the drone such as a rolling shutter or a global shutter camera. Global shutter provides better quality than rolling shutter and monochromatic but it is more expensive.

In various embodiment, the configuration may be suitable for capturing images in 'selfie' mode or 'panoramic' mode. For example, in 'selfie' mode usually a form of an auto portrait is taken and a higher quality output image data is desirable. For example, higher quality 3D information and improved image stitching outcome with less distortion and other errors in produced stitched image is desirable. In one embodiment, in such case a third camera may be used that is operable to directly obtain 3D information. In one embodiment, more than two cameras may be used such as three cameras. In one embodiment, the camera sensors in the configuration are positioned such that images obtained from, for example, two camera sensors for obtaining 2D information and one camera sensor configured to obtain 3D information having overlapping area of overlap. In this overlapping area, output image data would have better quality. In one embodiment, in a "selfie mode", the two or more cameras are positioned such that captured images overlap without spinning to allow high accuracy depth over a small focused area, for example, the face of a subject over which the cameras may be focused. In one embodiment, the depth information may be used to more accurately size and overlay graphics over the produced stitched image.

In another embodiment, in 'panoramic' mode it may be desirable to obtain a complete 360 degrees and a complete 360-degree depth map. To use a simple system configured for image stitching having only two camera sensors for example, spinning may be used. In one embodiment, the built-in ability of the drone to spin around its own axis is utilized to create both 360-degree image and a full 360-degree depth map, according to one embodiment. Drones spin about its own axis, not requiring additional motors to facilitate the rapid rotation around its own axis. In one embodiment, the cameras are spinning about an axis caused by the spinning of the drone. In other embodiments, spinning of the cameras may be caused in other ways such as being mounted to one or more devices respectively with spinning capability. In one embodiment, the first camera sensor may be spinning about an axis of the first camera sensor and the second camera sensor may be spinning about an axis of the second camera sensor. Spinning the cameras about an axis, as opposed to a fixed location, allows the full 360-degree panorama to be covered by both stitched and non-stitched regions, reducing errors from a single stitch line, creating a full 360-degree depth map. In one exemplary configuration, the two cameras are pointing in different directions, but the wide-angle lens of the camera sensors ensure that there are areas of overlap between the fields of view of the two camera sensors.

Figure 3A:
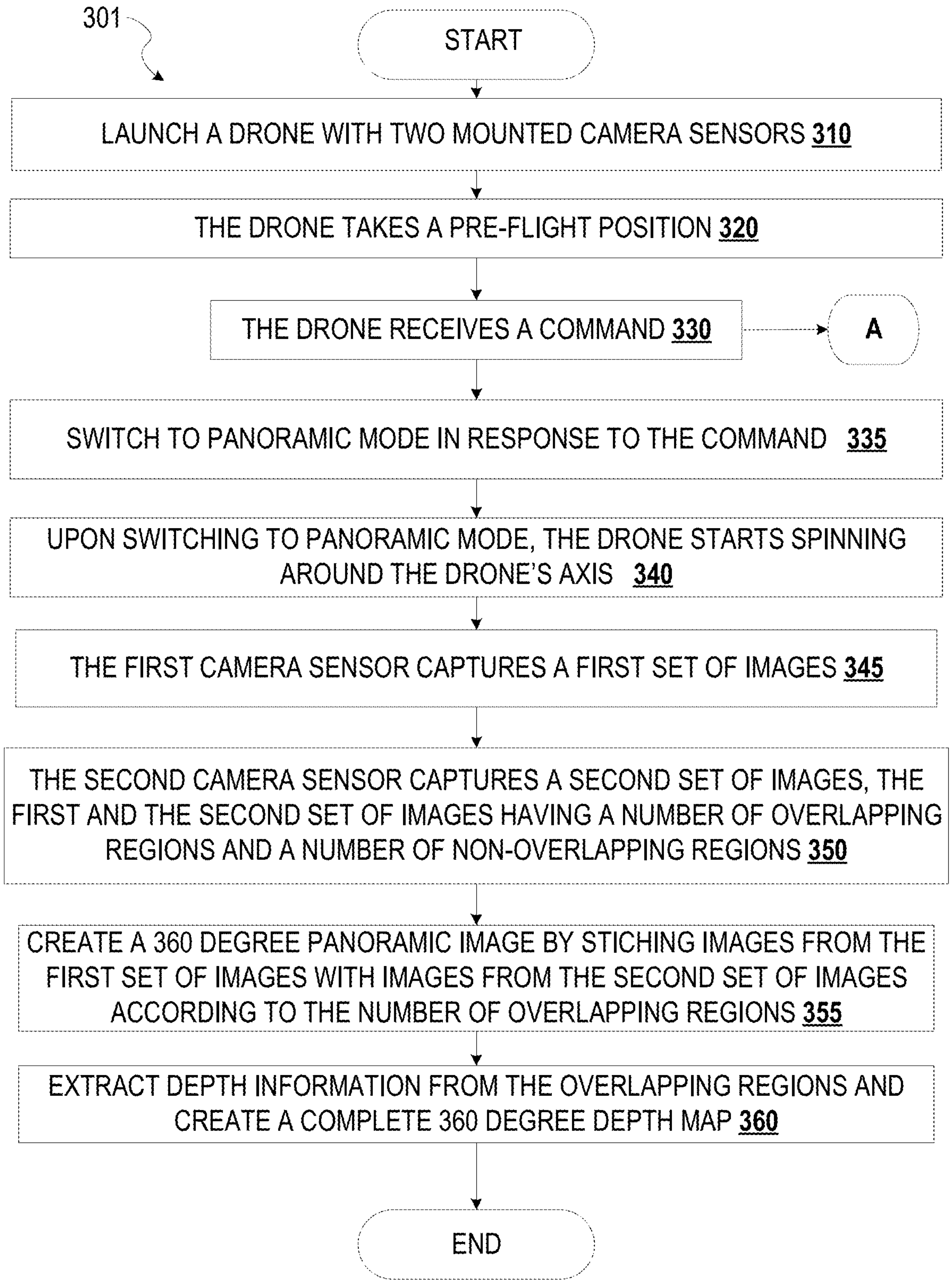
FIG. 3A illustrates a method in 'panoramic' mode to create a 360 degrees image and a complete 360 degrees depth map, according to one embodiment.

FIG. 3A illustrates a method 301 in 'panoramic' mode to create a 360-degree image and a complete 360-degree depth map, according to one embodiment. At 310, a drone with two mounted camera sensors is launched. At 320, the drone takes a pre-flight position such as a starting position in space. There are number of ways of how a drone can be launched and how the drone detects when to reposition itself so as to assume a starting position. For example, in one embodiment, the drone may detect when it is no longer in contact with the human skin, such as when a human operator removes a palm holding the drone. Alternatively, the drone may detect the force of gravity downward acceleration resultant to release of the drone, which triggers the propellers and the drone self-positions by hovering in air. In another example, if thrown or tossed in the air, the drone may stabilize itself and continue hovering. In yet another embodiment, the drone may receive a command such as from a remote-control device, a gesture, or a voice command to assume a starting position. In one aspect of motion-controlled operation, at least one initial operation of a drone may be controlled based on an initial motion of the drone imparted by a user. For example, an initial toss, roll, or spin may cause the drone to perform operations determined from aspects of the initial motion.

Once the drone has taken a pre-flight position, at 330, the drone receives a command, according to one embodiment. Alternatively, the drone may be pre-programmed to operate in a pre-determined mode such as a 'panoramic' or 'selfie' mode without an input command. In one embodiment, the drone receives a command to switch from pre-flight state to the 'panoramic' mode. At 335, the drone switches to 'panoramic' mode in response to the command, according to one embodiment. Upon switching to the 'panoramic' mode, at 340, the drone commences motion and starts to spin around the drone's own axis. Spinning of the drone causes the two camera sensors to capture images in real time while the drone is spinning. Thereby, at 345, the first camera sensor captures a first set or sequence of images and, 350, the second camera sensor captures a second set or sequence of images, both the first and the second set obtained in real-time while the drone is spinning. The first and the second camera sensors are spaced in a stereoscopic arrangement such that the first and the second set of images have a number of overlapping regions and a number of non-overlapping regions. At 355, a 360-degree image is created by stitching images from the first set of images with images from the second set of images according to the number of overlapping regions. In one embodiment, the stitching component 230 of FIG. 2 performs the stitching. At 365, depth information is extracted from the number of overlapping regions and a complete 360-degree depth map is created, according to one embodiment. Spinning the cameras about an axis, as opposed to a fixed location, allows a full 360 degrees panorama image to be derived from both overlapping and non-overlapping regions, reducing errors from a single stitch line, creating a full 360-degree depth map. Spinning causes an increased number in the stitching lines along which corresponding images from the first and the second set of images are stitched. With the increase of the number of stich lines and overlapping regions created in real time, the depth map is more frequently updated. More frequent updates of the depth map provide more complete representation of the current state of the surrounding environment. For example, two camera sensors may be used to generate a 360-degree image by stitching. The two camera sensors may be mounted on a drone spinning at 60 rotations per minute. Therefore, every half a second, due to the presence of two stitch lines, a full depth map is generated, thereby producing a complete 360 degrees picture with depth information. A "panoramic" mode may allow for high quality 360-degree image with lesser depth accuracy but more complete 3D coverage while the cameras spin. The greater the overlapping regions, the fuller and more encompassing is the depth information picture of the surrounding environment.

In some embodiments, the drone determines the distance between itself and an object point or a reference object such as a user by processing image content captured by its onboard camera sensors. Depth information is extracted such as a point cloud and an estimation is made of the direct line distance between the drone and the user based on the extracted point cloud. In a more specific embodiment, the drone may carry two or more cameras in a stereoscopic arrangement, and by using triangulation between the two or more cameras and the object point, the drone can determine the distance between the object point and the drone.

Figure 3B:
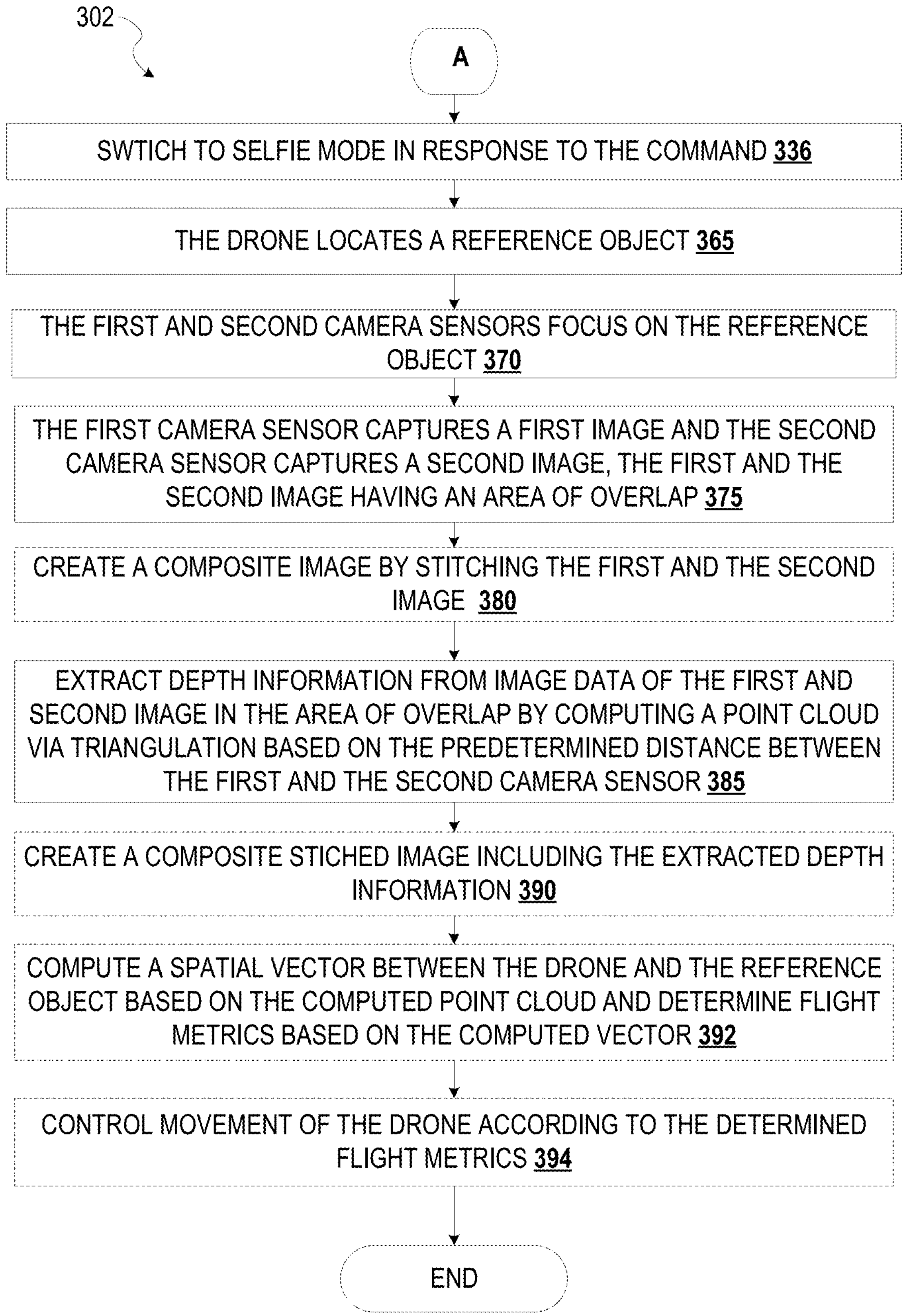
FIG. 3B illustrates a method in 'selfie mode to create high accuracy point cloud, according to one embodiment.

FIG. 3B illustrates a method 302 in 'selfie mode to create high accuracy point cloud, according to one embodiment. At 336, the drone switches to 'selfie' mode in response to the command, according to one embodiment. Upon switching to the 'selfie mode, the drone may stabilize while staying aloft and, at 365, the drone locates a reference object. In some embodiments, the reference object may be a human operator that controls the drone movement. There are a number of ways for the drone to locate the object of reference and therefrom compute a point cloud and a spatial vector between the reference object and the drone. For example, the drone may carry one or more cameras and by processing captured images, the drone may identify a human operator's face, eyes, body, etc. A camera or image capture device of the drone may continuously capture a video feed in which the operator is present. The video feed captured may be is processed on-the-fly by an onboard image processor of the drone to recognize a face, a body, a clothing selection, or other distinguishing characteristics or aspects of the operator. The image processor may identify facial movements, body movements, or other gestures of the operator in some embodiments. The operator may be identified among a number of other subjects by facial recognition, object recognition (e.g., to recognize a predefined visual identifier associated with the operator), or automated feature recognition to identify a distinctive visual feature associated with the operator (e.g., a particular color of clothing or visually distinctive object such as a control wand or wristband). In one example embodiment, for instance, the drone is configured to automatically, upon manual launch, identify the operator, identify at least one distinctive visual feature of the operator (e.g., a distinctly colored article of clothing worn by the operator), and thereafter automatically to track the operator based on automated recognition of the distinctive visual feature In one embodiment, once the reference object is located, at 370, the first and the second camera sensors may focus on the reference object. At 374, the first camera sensor captures a first image and the second camera sensor captures a second image. The first and the second image have an area of overlap. In one embodiment, optionally, at 380, a composite image is created by stitching the first and the second image according to a stich line in the area of overlap. At 385, depth information is extracted from image data of the first and second image in the area if overlap by computing a point cloud via triangulation based on the predetermined distance between the first and the second camera sensor. In one embodiment, optionally, at 390, a composite stitched image is created including the extracted depth information. In one embodiment, optionally, at 392, a spatial vector between the drone and the reference object is computed based on the computed point cloud. The spatial vector defining a direction and a distance by which the drone is spaced from the reference object, where the distance is derived from the computed point cloud. Further, flight metrics are determined based on the computed vector. The flight metrics include, but are not limited to, a flight direction which is variable as a function of the direction of the spatial vector, and at least one distance-dependent attribute which is variable as a function of the distance of the spatial vector. In one embodiment, a flight speed metric may also optionally be determined based on the computed vector.

At 394, movement of the drone is controlled according to the determined flight metrics. The drone may fly the same distance that is the distance between the drone and the object of reference in a direction opposite to the object reference, according to the computed direction between the drone and the object. Alternatively, the drone may fly in a direction towards the reference object and an object of interest, according to the computed vector in a fly-over exemplary flight path, according to one embodiment. In yet another embodiment, the drone may fly around the reference object and towards the object of interest according to the computed vector between the drone and the object in an exemplary fly-around flight path. In yet another embodiment, the drone may fly opposite to the object of reference but instead in a straight line, the drone may fly in a curve line or arc according to the computed vector between the drone and the object. Various types of actions may be performed according to the determined flight metrics. In one embodiment, the point cloud may be used for user identification and tracking. For example, when the drone operates in a 'follow me' mode, the drone may track and follow the user based on the computed point cloud and adjusting its position accordingly. The "follow me" mode is a mode of operation in which the drone is configured to automatically identify and track the operator while the operator is moving. Thus, the drone may be configured to automatically center on or otherwise track a particular user identified as operator of the drone. The drone may be configured to automatically maintain a pre-determined distance between the drone and the operator, according to one example. The pre-determined distance may be maintained based on the computed point cloud. Another exemplary mode of operation is when the drone is configured or operable to keep the operator within the field of view of the one or more mounted cameras. The operator may be automatically identified by the drone by processing a video stream or still images captured by on-board cameras mounted onto the drone.

An unmanned aerial vehicle (UAV), also referred to as a drone, often forms part of an unmanned aircraft system (UAS) that includes the drone, a remote-control device, and a system for communication between the drone and the remote-control device. Some systems provide for drone control by an operator without use of a remote-control device. Drones are typically intelligent machines with the ability to self-stabilize in air, and hold a GPS position. Many drones have multiple rotors that drive respective spinning propellers to generate lift, with a control system typically maintaining stability of the drone by varying the rotational speeds of the respective propellers.

Figure 4:
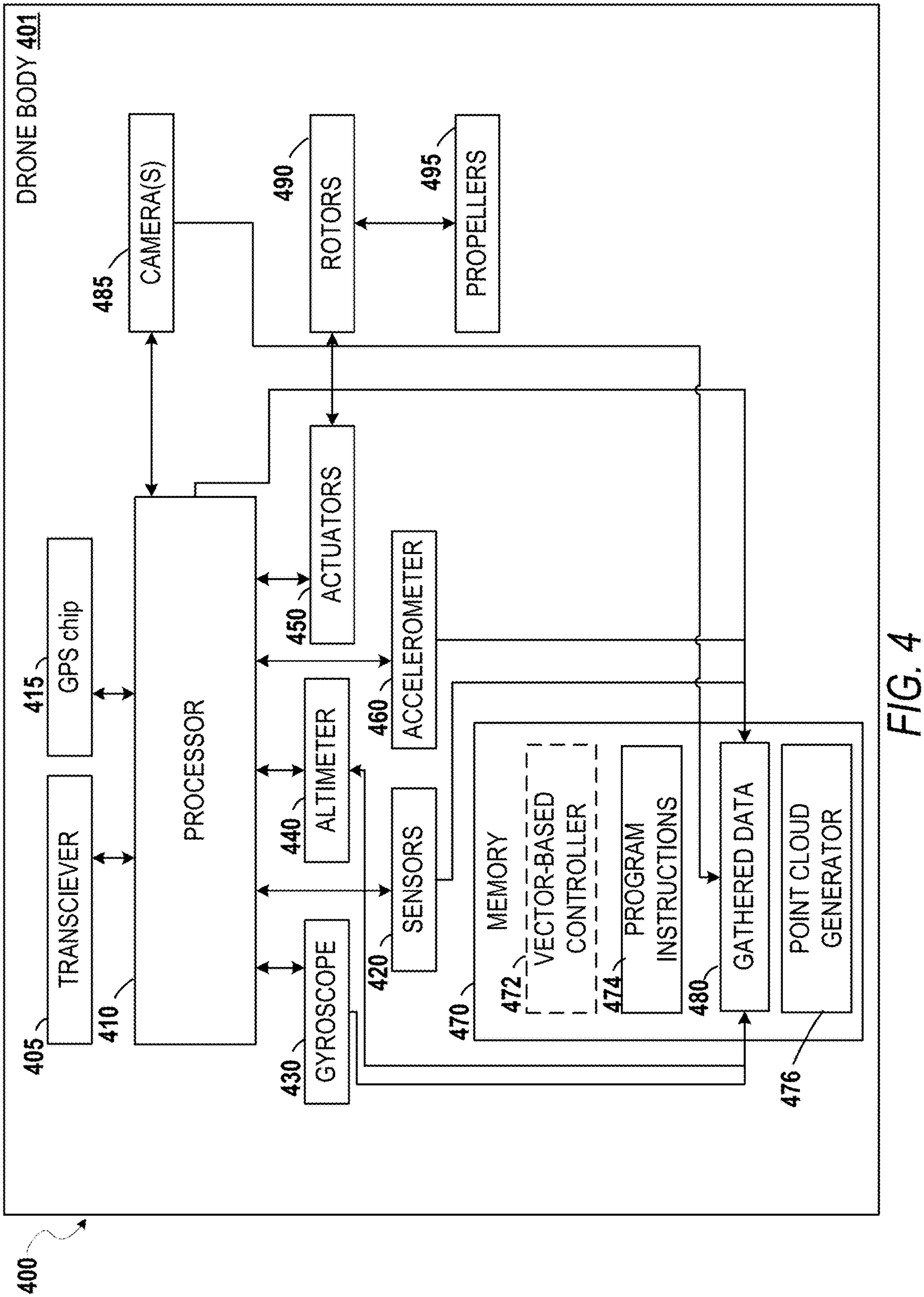
FIG. 4 illustrates an exemplary drone, according to one embodiment.

FIG. 4 represents an exemplary simplified drone 400, according to one embodiment. Drone 400 comprises a drone body 401. In one embodiment, the drone may be a quad-copter having a body housing an electrically powered drive mechanism to drive, for example, four rotors 490 mounted on drone body 401 in order to provide aerodynamic lift to the drone 400, as well as to accelerate and rotate the drone 400. The rotors 490 once actuated by actuators 450 in response to instructions executed by processor 410, spin the propellers 495. Power source is required to get propellers 495 spinning. In one embodiment, drone 400 may comprise one or more removable battery sources (not illustrated) to power, among others, rotors 490. Having more than one propeller gives the drone 400 more fail-safes. For instance, if one of the motors fails, the drone 400 can still stay aloft with the remaining motors working in concert to compensate. In addition, the more rotors that are incorporated into the drone body 401, the more lift the drone 400 will generate, allowing the drone to carry a heavier payload such as one or more cameras 485.

In one embodiment, drone 400 further includes one or more cameras 485 mounted on drone body 401. For example, a front camera may be mounted onto the drone body 401, where the drone camera is positioned to pick up images of the scene towards which the drone is directed. In addition, as an auxiliary camera or exclusively, a vertically-directed camera may be mounted on the drone body 401, where the vertically-directed camera is positioned to pick up images of the terrain being overflown. The one or more cameras 485 may be movably or fixedly mounted on the drone body 401, being coupled to the body 401 via one or more actuators or other mechanisms to control orientation of the one or more cameras 485 relative to the drone body 401. Data such as video and digital images captured by cameras 485 may be stored in memory 470, e.g., as gathered data 480. Further, data captured by cameras 485 may be streamed in near-real time wireless to a control device or to one or more server or client system as illustrated in FIG. 9

In order to take flight, drones may require a controller, e.g., a remote-control device that a pilot may use to launch, land, and navigate drone 400. Controllers can take many forms, from gamepad-like controllers to smartphones and tablets. Regardless of their design, controllers require communication with the drone, and typically do that using radio waves. For example, drones are typically run by 2.4 gigahertz radio waves. To communicate with a drone, many drone controllers use Wi-Fi, which can be transmitted on the 2.4 gigahertz spectrum, and is used by smartphones and tablets for communication. In one embodiment, drone 400 communicates with one or more controllers or remote control devices (not illustrated in FIG. 4) via transceiver 405.

In one embodiment, modern onboard drone technology includes a GPS chip 415 inside the drone body 401 that relays location of drone 400 to the controller. It also logs, for example, in memory 470, the takeoff spot of drone 400. The takeoff spot may be used in case the drone 400 needs to return unassisted. GPS chip 415 provides accurate position of the drone 400 and allows for auto-pilot features or for methods, as described herein, for movement control based on a user-drone vector. GPS chip 415 allows drone 400 to follow a pre-programmed path; return home or to a starting position autonomously if drone 401 loses data connection or flies out of range; and also to operate in follow mode in which drone 401 follows the pilot at a specified altitude and distance. In one embodiment, GPS technology is not necessary prerequisite methods for controlling the drone's movement based on the user-drone vector.

Accelerometer 460 in conjunction with gyroscope 430 and altimeter 440 are the onboard sensors that keep drone 400 aloft. For instance, altimeter 440 is an instrument for determining attained altitude, e.g., especially used in air-crafts. So, when the drone is set to hover in place, the altimeter 440 will instruct the drone to maintain that height. In addition, the GPS chip 415 allows the drone to be hold within the x and z axes, correcting course when necessary such as when there is wind. Accelerometer 460 is a device that measures acceleration and velocity and is used in drones for flight stabilization. Gyroscope 430 is instrument for measuring and maintaining orientation. Sensors 420 may be additional navigational or motion sensors or other types of sensors concerned with sensing the surrounding environment, or any other suitable type of sensor.

In one embodiment, navigation of drone 400 may be pre-programmed and a route to be represented as a machine-readable program instruction 474 loaded into memory 470 of drone 400. Alternatively, or in addition, movement of the drone may be controlled by vector-based controller component 472 embodied in machine readable program instruction loaded into memory 470 and executed by processor 410, according to various methods described herein. A flight route for drone 400 may be computed based on a user-drone vector as implemented by vector-based controller component 472.

Figure 5:
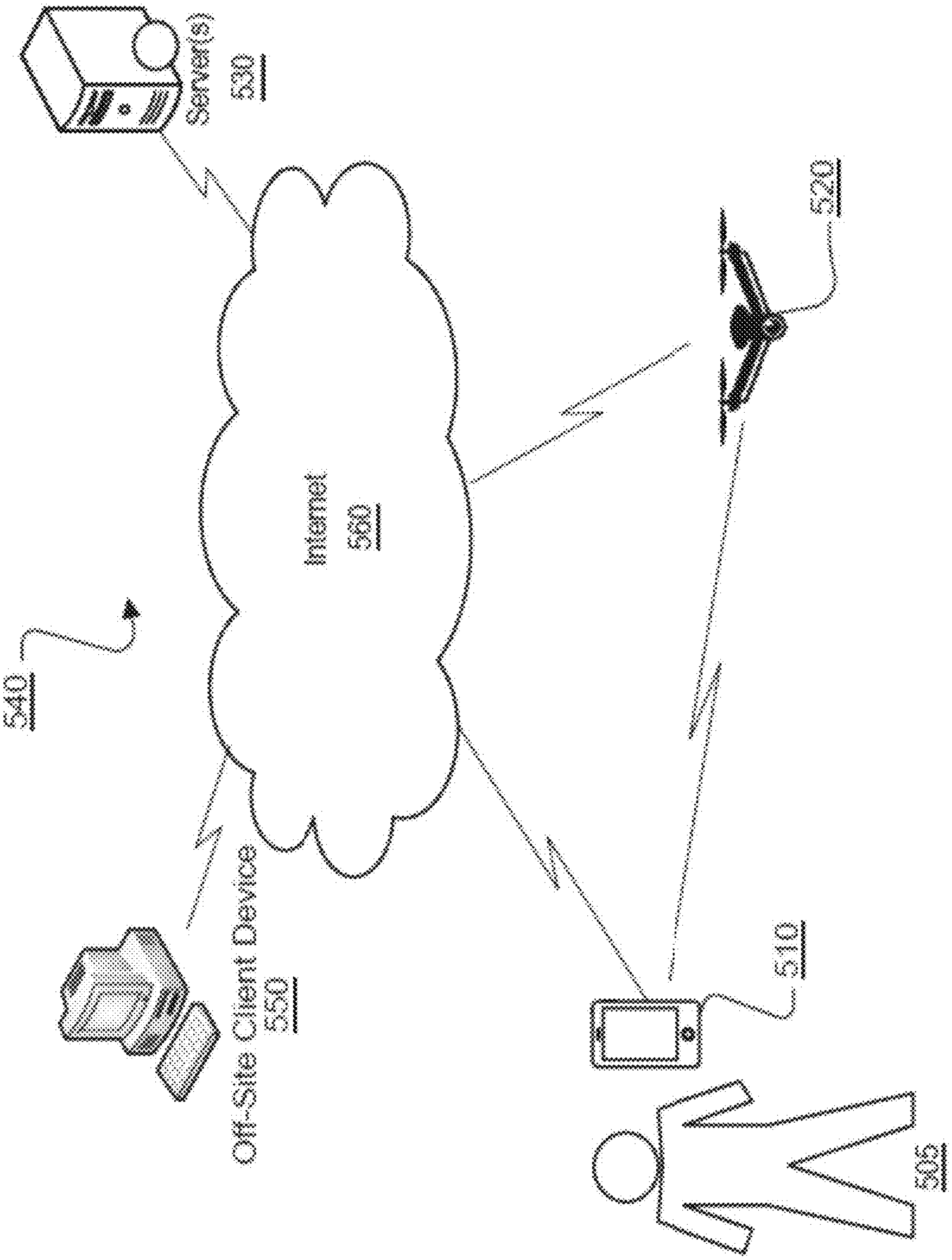
FIG. 5 is a schematic diagram illustrating a drone system 500, according to one embodiment.

FIG. 5 is a schematic diagram illustrating a drone system 500 of which a drone 520 such as that previously described may in some embodiments form part. In embodiments such as that shown in FIG. 5, the drone 520 may, instead of or in addition to an on-site control device (e.g., mobile phone 510), be communicatively coupled via a distributed network (e.g., the Internet 560), to one or more off-site client devices 550 and/or to one or more servers 530 providing various online services. In some instances, communication between the on-site remote-control device (e.g., a mobile phone 510) and the drone 520 may be via the Internet 560 (e.g., by means of a cellular telephone network). In some embodiments, the server 530 may provide a social networking service, to enable communication of content (e.g., photos, videos, status updates, media content messages, and the like) directly to a social media sites such as Snapchat® from the drone 520, in flight. For example, data captured by cameras of drone 520 may be broadcasted or otherwise communicated wireless in near-real time to a control device such as mobile phone 510 or to one or more server 530 or client devices 550.

Figure 6:
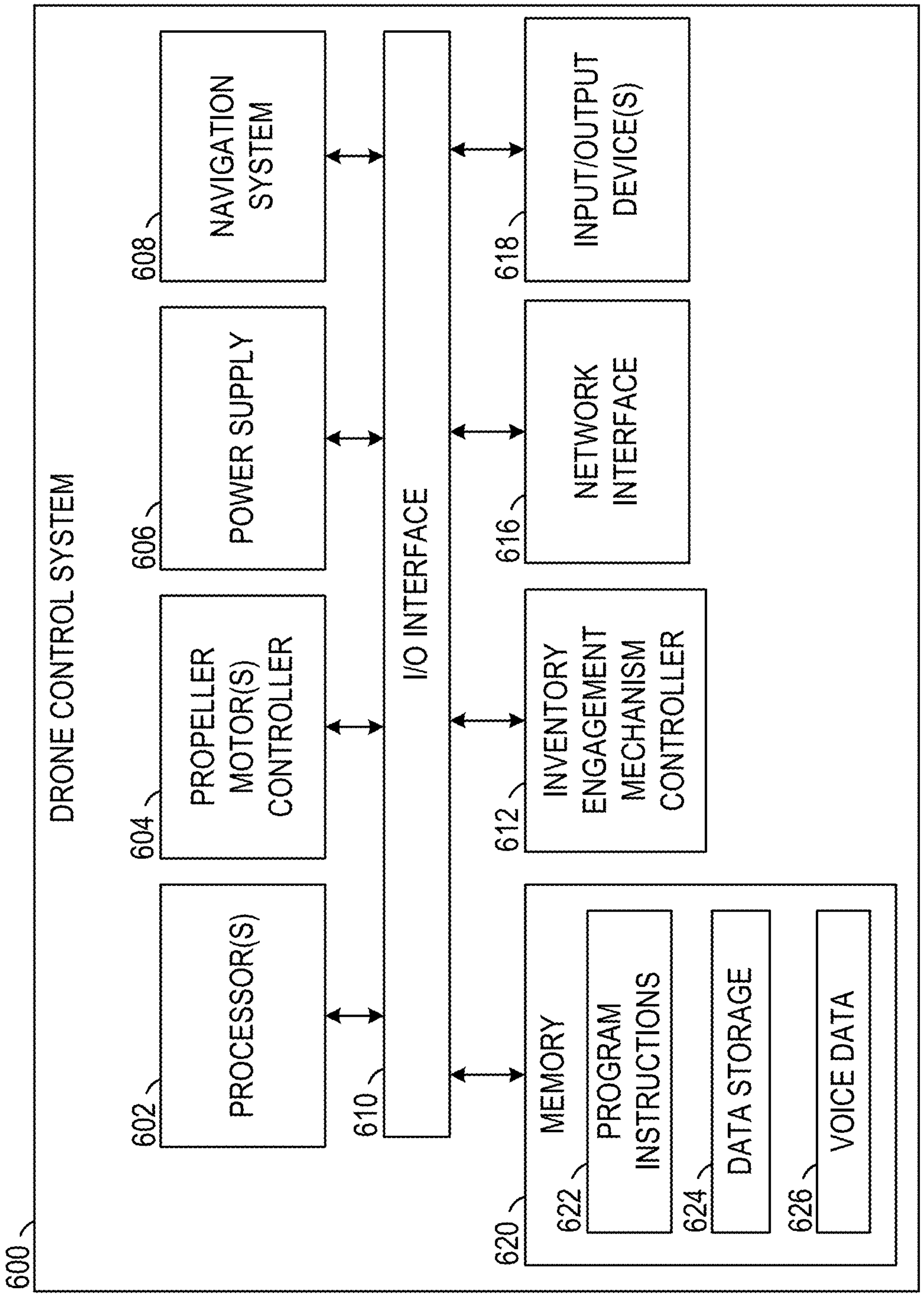
FIG. 6 is a block diagram illustrating an example UAV control system of a UAV such as a drone, according to one embodiment.

FIG. 6 is a block diagram illustrating an example UAV control system 600 of a UAV such as the drone 400 previously described with reference to various example embodiments. In various examples, the block diagram may be illustrative of one or more aspects of the UAV control system 600 that may be used to implement the various systems and methods discussed above. In the illustrated implementation, the UAV control system 600 includes one or more processors 602, coupled to a non-transitory computer readable storage medium in the form of a memory (or storage medium 620) via an input/output (I/O) interface 610. The UAV control system 600 may also include a propeller motor controller 604, such as an electronic speed control (ESC), a power supply 606 and/or a navigation system 608. The UAV control system 600 further includes an inventory engagement mechanism controller 612, a network interface 616, and one or more input/output devices 618.

In various implementations, the UAV control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, navigation paths and/or data items accessible by the processor(s) 602. In various implementations, the nontransitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624 and voice data 626, respectively. In other implementations, program instructions, data and/or voice data may be received, sent or stored upon different types of computer-accessible media, such as non-transitory media, or on similar media separate from the non-transitory computer readable storage medium 620 or the UAV control system 600. Generally speaking, a non-transitory, computer readable storage medium may include storage media or memory media such as magnetic or optical media, e.g., disk or CD/DVDROM, coupled to the UAV control system 600 via the I/O interface 610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface 610 or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The propeller motor(s) controller 604 communicates with the navigation system 608 and adjusts the power of each propeller motor to guide the UAV along a determined navigation path to a delivery location. The navigation system 608 may include a GPS or other similar system than can be used to navigate the UAV to and/or from a delivery location. The inventory engagement mechanism controller 612 communicates with the motor(s) (e.g., a servo motor) used to engage and/or disengage inventory. For example, when the UAV is positioned over a level surface at a delivery location, the inventory engagement mechanism controller 612 may provide an instruction to a motor that controls the inventory engagement mechanism to release the inventory.

The network interface 616 may be configured to allow data to be exchanged between the UAV control system 600, other devices attached to a network, such as other computer systems, and/or with UAV control systems of other UAVs. For example, the network interface 616 may enable wireless communication between numerous UAVs that are transporting inventory to various delivery destinations. In various implementations, the network interface 616 may support communication via wireless general data networks, such as a Wi-Fi network. For example, the network interface 616 may support communication via telecommunications networks such as cellular communication networks, satellite networks, and the like.

Input/output devices 618 may, in some implementations, include one or more displays, image capture devices, thermal sensors, infrared sensors, time of flight sensors, accelerometers, pressure sensors, weather sensors, etc. Multiple input/output devices 618 may be present and controlled by the UAV control system 600. One or more of these sensors may be utilized to assist in the landing as well as avoid obstacles during delivery and/or engagement of inventory. For example, utilizing a location signal from the GPS receiver and one or more IR sensors, the UAV may safely land on a location designated by the user. The IR sensors may be used to provide real-time data to assist the UAV in avoiding moving/movable obstacles.

As shown in FIG. 6, the memory 620 may include program instructions 622 which may be configured to implement the example processes and/or sub-processes described above. The data storage 624 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Software Architecture

Figure 7:
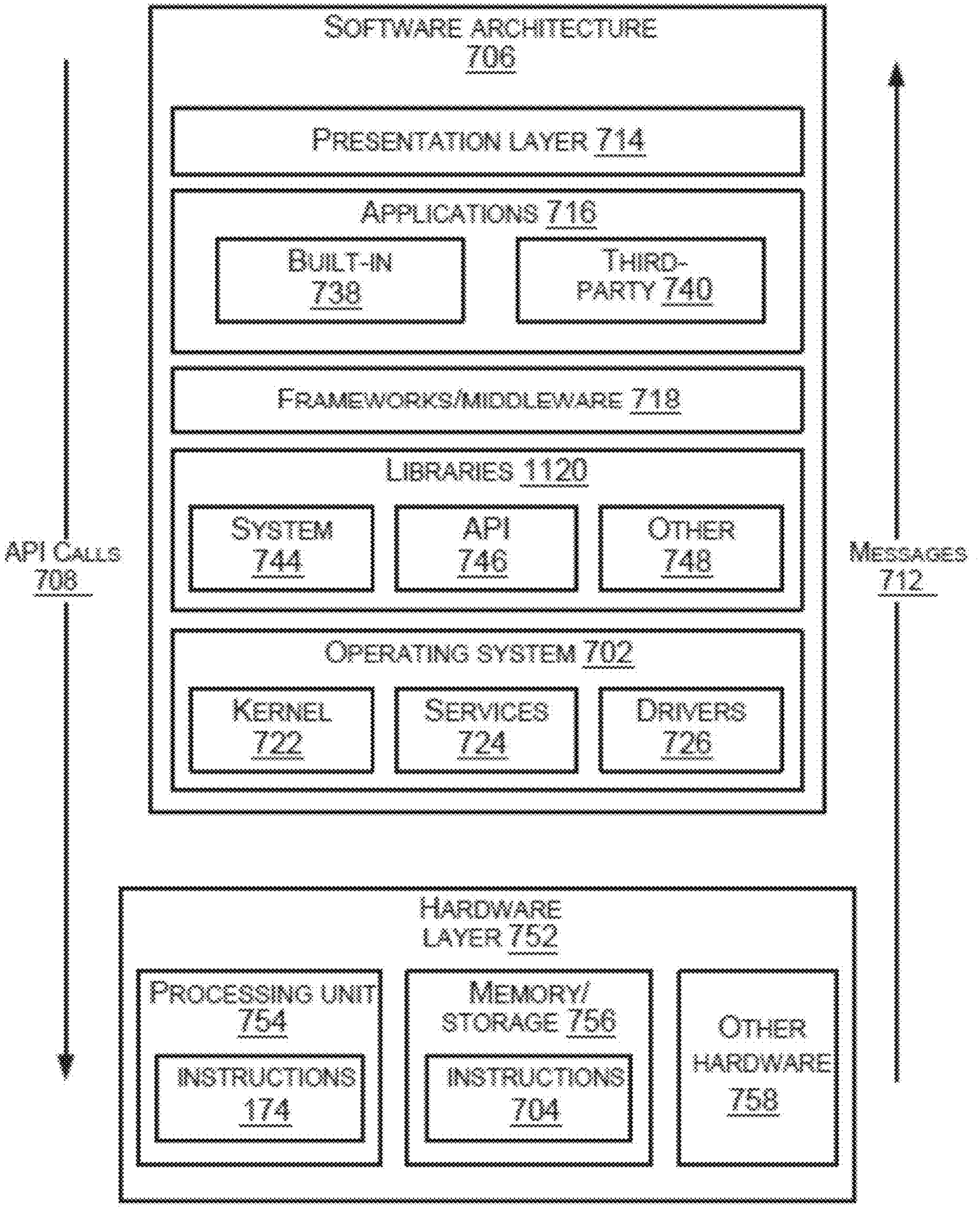
FIG. 7 is a block diagram illustrating an example software architecture, which may be used in conjunction with various hardware architectures herein described, according to one embodiment.

FIG. 7 is a block diagram illustrating an example software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as machine 1200 of FIG. 12 that includes, among other things, processors 1210, memory 1230, and I/O components 1250. A representative hardware layer 752 is illustrated and can represent, for example, the machine 1200 of FIG. 12. The representative hardware layer 752 includes a processing unit 754 having associated executable instructions 704. Executable instructions 704 represent the executable instructions of the software architecture 706, including implementation of the methods, components and so forth described herein. The hardware layer 752 also includes memory and/or storage modules memory/storage 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, applications 716 and a presentation layer 714. Operationally, the applications 716 and/or other components within the layers may invoke application programming interface (API) API calls 708 through the software stack and receive a response as in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724 and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems.

The third-party applications 740 may invoke the API calls 708 provided by the mobile operating system (such as operating system 702) to facilitate functionality described herein.

The applications 716 may use built in operating system functions (e.g., kernel 722, services 724 and/or drivers 726), libraries 720, and frameworks/middleware 718 to create user interfaces to interact with users of the system. Alternatively, or additionally, in some systems interactions with a user may occur through a presentation layer, such as presentation layer 714. In these systems, the application/component "logic" can be separated from the aspects of the application/component that interact with a user.

Figure 8:
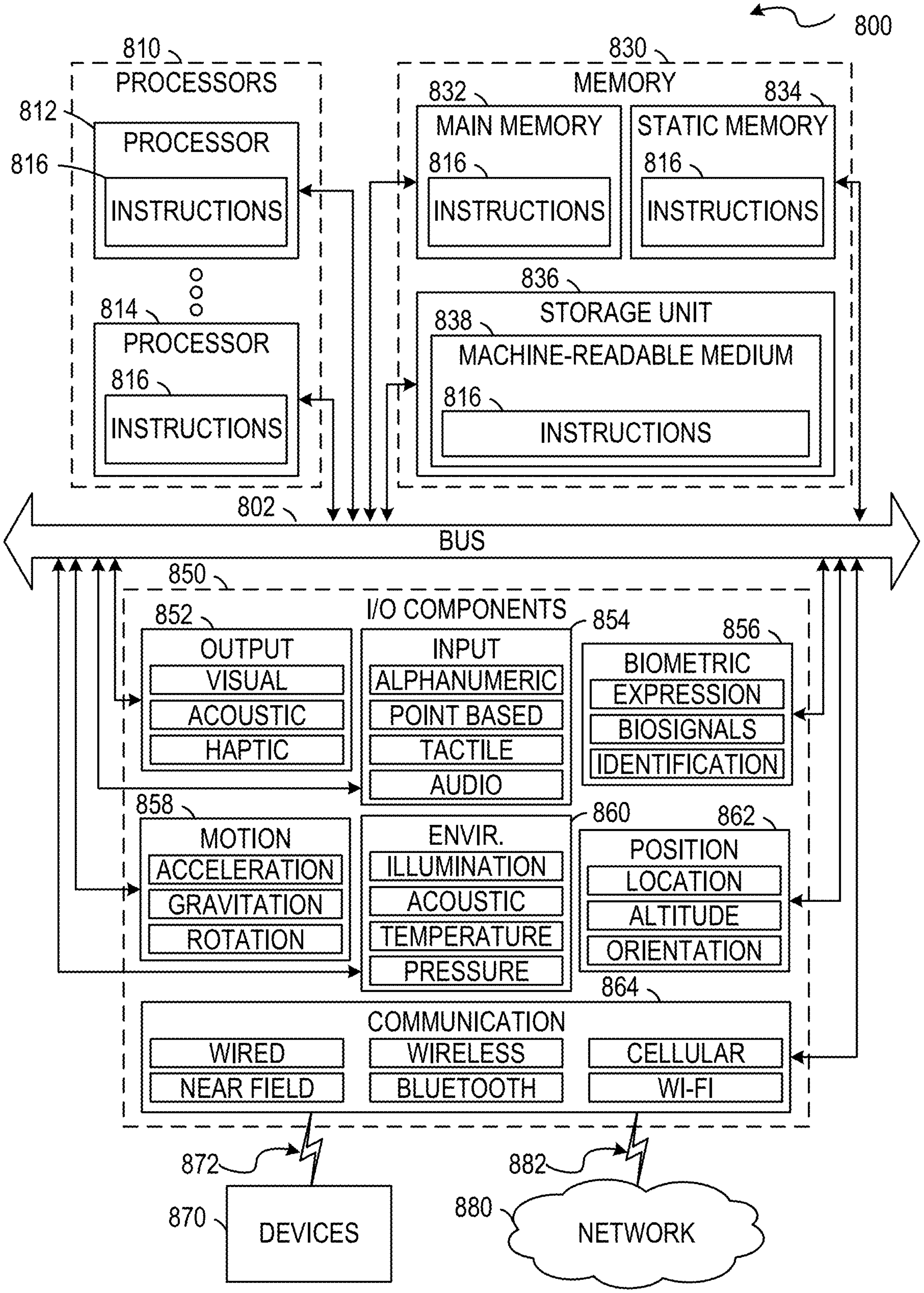
FIG. 8 illustrates components of a machine able to read instructions from a machine-readable medium and perform any one or more of the methodologies discussed herein, according to one embodiment The headings provided herein are merely for convenience and do not necessarily affect the scope or meaning of the terms used.

FIG. 8 is a block diagram illustrating components of a machine 800, according to some example embodiments, able to read instructions from a machine-readable medium 838 (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory memory/storage 830, and I/O components 850, which may be configured to communicate with each other such as via a bus 802. The memory/storage 830 may include a memory, such as a main memory 832 and static memory 834, or other memory storage, and a storage unit 836, both accessible to the processors 810 such as via the bus 802. The storage unit 836 and main memory 832 and static memory 834 store the instructions 816 embodying any one or more of the methodologies or functions described herein. The instructions 816 may also reside, completely or partially, within the main memory 832 and static memory 834, within the storage unit 836, within at least one of the processors 810 (e.g., within the processor's cache memory), or any suitable combination thereof, during execution thereof by the machine 800. Accordingly, the main memory 832 and static memory 834, the storage unit 836, and the memory of processors 810 are examples of machine-readable media.

The I/O components 850 may include a wide variety of components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and output components 852. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The output components 852 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental environment components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environment components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network being the k (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An apparatus of a drone comprising:

a first camera sensor and a second camera sensor, wherein the first camera sensor and the second camera sensor each have a field of view of more than 180 degrees, and wherein the first camera sensor is mounted on the drone a predetermined distance from the second camera sensor;

at least one processor; and at least one memory storing instructions that, when executed by the at least one processor, configure the at least one processor to perform operations comprising:

capturing, simultaneously, a plurality of first images by the first camera sensor and a plurality of second images by the second camera sensor while the drone spins around an axis of the drone or the first camera sensor and the second camera sensor spin around the axis of the drone, wherein the plurality of first images has a plurality of overlapping regions with the plurality of second images; and processing, based on the predetermined distance and the plurality of first images being captured simultaneously with the plurality of second images, the plurality of overlapping regions to generate a 360-degree depth map by extracting depth information, between corresponding pixels in the plurality of overlapping regions, through triangulation using the predetermined distance as a baseline for parallax calculations, wherein the plurality of overlapping regions cover a 360-degree range.

2. The apparatus of claim 1, wherein the processing the plurality of overlapping regions to generate the 360-degree depth map further comprises:

extracting, based on a location of the first camera sensor relative to the second camera sensor, depth information from a corresponding overlapping region of the plurality of overlapping regions to create a point cloud.

3. The apparatus of claim 2, wherein the operations further comprise:

determining, based on the created point cloud, a distance between a reference object, and at least one of the first camera sensor and the second camera sensor.

4. The apparatus of claim 2, wherein the operations further comprise:

determining, based on the created point cloud, a distance between the drone and a reference object by computing a spatial vector between the drone and the reference object;

determining flight metrics according to the computed spatial vector; and controlling movement of the drone according to the determined flight metrics.

5. The apparatus of claim 4, wherein the controlling movement further comprises:

controlling movement of the drone according to the determined flight metrics by controlling actuators to spin propellers of the drone.

6. The apparatus of claim 1, wherein the processing the plurality of overlapping regions to generate the 360-degree depth map further comprises:

processing, using parallax, the plurality of overlapping regions to generate the 360-degree depth map, wherein the plurality of overlapping regions cover the 360-degree range of the 360-degree depth map.

7. The apparatus of claim 1, wherein the operations further comprising:

associating the 360-degree depth map with a 360-degree image.

8. The apparatus of claim 7, wherein the operations further comprise:

determining sizes for graphics for the 360-degree image based on the 360-degree depth map; and generating the graphics over the 360-degree image.

9. The apparatus of claim 1, wherein the drone spins around an axis of the drone at 20 to 100 rotations per minute.

10. The apparatus of claim 1, wherein images of the plurality of first images are captured simultaneously with corresponding images of the plurality of second images.

11. The apparatus of claim 1, wherein the processing the plurality of overlapping regions to generate the 360-degree depth map further comprises:

processing, by one or more processors, the plurality of first images and the plurality of second images to create a 360-degree image by stitching the plurality of first images together with the plurality of second images according to a corresponding overlapping region of the plurality of overlapping regions.

12. A non-transitory processor-readable storage medium storing processor executable instructions that, when executed by at least one processor of an apparatus of a drone, cause the at least one processor to perform operations comprising:

capturing, simultaneously, a first camera sensor and a second camera sensor, a plurality of first images by the first camera sensor and a plurality of second images by the second camera sensor while the drone spins around an axis of the drone or the first camera sensor and the second camera sensor spin around the axis of the drone, wherein the plurality of first images has a plurality of overlapping regions with the plurality of second images, wherein the first camera sensor and the second camera sensor each have a field of view of more than 180 degrees, and wherein the first camera sensor is mounted on the drone a predetermined distance from the second camera sensor; and processing, based on the predetermined distance and the plurality of first images being captured simultaneously with the plurality of second images, the plurality of overlapping regions to generate a 360-degree depth map by extracting depth information, between corresponding pixels in the plurality of overlapping regions, through triangulation using the predetermined distance as a baseline for parallax calculations, wherein the plurality of overlapping regions cover a 360-degree range.

13. The non-transitory processor-readable storage medium of claim 12, wherein the processing the plurality of overlapping regions to generate the 360-degree depth map further comprises:

extracting, based on a location of the first camera sensor relative to the second camera sensor, depth information from a corresponding overlapping region of the plurality of overlapping regions to create a point cloud.

14. The non-transitory processor-readable storage medium of claim 13, wherein the operations further comprise:

determining, based on the created point cloud, a distance between a reference object, and at least one of the first camera sensor and the second camera sensor.

15. The non-transitory processor-readable storage medium of claim 13, wherein the operations further comprise:

determining, based on the created point cloud, a distance between the drone and a reference object by computing a spatial vector between the drone and the reference object;

determining flight metrics according to the computed spatial vector; and controlling movement of the drone according to the determined flight metrics.

16. The non-transitory processor-readable storage medium of claim 15, wherein the controlling movement further comprises:

controlling movement of the drone according to the determined flight metrics by controlling actuators to spin propellers of the drone.

17. A method performed by an apparatus of a drone, the method comprising:

capturing, simultaneously, a first camera sensor and a second camera sensor, a plurality of first images by the first camera sensor and a plurality of second images by the second camera sensor while the drone spins around an axis of the drone or the first camera sensor and the second camera sensor spin around the axis of the drone, wherein the plurality of first images has a plurality of overlapping regions with the plurality of second images, wherein the first camera sensor and the second camera sensor each have a field of view of more than 180 degrees, and wherein the first camera sensor is mounted on the drone a predetermined distance from the second camera sensor; and processing, based on the predetermined distance and the plurality of first images being captured simultaneously with the plurality of second images, the plurality of overlapping regions to generate a 360-degree depth map by extracting depth information, between corresponding pixels in the plurality of overlapping regions, through triangulation using the predetermined distance as a baseline for parallax calculations, wherein the plurality of overlapping regions cover a 360-degree range.

18. The method of claim 17, wherein the processing the plurality of overlapping regions to generate the 360-degree depth map further comprises:

extracting, based on a location of the first camera sensor relative to the second camera sensor, depth information from a corresponding overlapping region of the plurality of overlapping regions to create a point cloud.

19. The method of claim 18, wherein the method further comprises:

determining, based on the created point cloud, a distance between a reference object, and at least one of the first camera sensor and the second camera sensor.

20. The method of claim 18, wherein the method further comprises:

determining, based on the created point cloud, a distance between the drone and a reference object by computing a spatial vector between the drone and the reference object;

determining flight metrics according to the computed spatial vector; and controlling movement of the drone according to the determined flight metrics.

* * * * *